United States Patent [19]

Baba

[11] Patent Number: 4,972,395
[45] Date of Patent: Nov. 20, 1990

[54] OPTO-MAGNETIC RECORDING APPARATUS FOR SEQUENTIALLY DRIVING OPTICAL HEAD DRIVE MEANS AND BIASING MAGNETIC FIELD GENERATION MEANS

[75] Inventor: Hisatoshi Baba, Yokohama, Japan

[73] Assignee: Canon Kabushiki Kaisha, Tokyo, Japan

[21] Appl. No.: 506,551

[22] Filed: Apr. 6, 1990

Related U.S. Application Data

[63] Continuation of Ser. No. 33,182, Apr. 2, 1987, abandoned.

[30] Foreign Application Priority Data

Apr. 10, 1986 [JP] Japan .................................. 61-081107

[51] Int. Cl.⁵ ...................... G11B 13/04; G11B 11/14
[52] U.S. Cl. ........................... 369/13; 360/114; 360/59
[58] Field of Search ............ 369/13, 32; 360/59, 360/114; 365/122

[56] References Cited

U.S. PATENT DOCUMENTS

| 4,120,010 | 10/1978 | Mitsuya | 360/103 |
| 4,316,278 | 2/1982 | Endter | 369/100 |
| 4,608,676 | 8/1986 | Yoshida et al. | 369/32 |
| 4,701,894 | 10/1987 | Watson | 360/114 |
| 4,712,203 | 12/1987 | Saito et al. | 369/13 |

FOREIGN PATENT DOCUMENTS

| 0153676 | 9/1985 | European Pat. Off. | |
| 0164745 | 12/1985 | European Pat. Off. | 369/13 |
| 59-140604 | 8/1984 | Japan | 369/13 |
| 2119999 | 11/1983 | United Kingdom | |

Primary Examiner—Stuart S. Levy
Assistant Examiner—Hoa Nguyen
Attorney, Agent, or Firm—Fitzpatrick, Cella, Harper & Scinto

[57] ABSTRACT

An opto-magnetic recording apparatus for sequentially driving an optical head driver and a biasing magnetic field generator. The apparatus includes a biasing magnetic field generator for applying a biasing magnetic field to an opto-magnetic recording medium, an optical head for irradiating a light beam spot onto a portion of the medium while the biasing magnetic field is applied, thereby to record or erase information, an optical head driver to drive an optical head by an electromagnetic force to make the light beam spot access desired positions on the medium, and a controller for deactivating the magnetic field generator when the driver is activated and activating the magnetic field generator after the drive by the driver is completed.

4 Claims, 1 Drawing Sheet

OPTO-MAGNETIC RECORDING APPARATUS FOR SEQUENTIALLY DRIVING OPTICAL HEAD DRIVE MEANS AND BIASING MAGNETIC FIELD GENERATION MEANS

This application is a continuation-in-part continuation division, of prior application Ser. No. 07/033,182 filed Apr. 2, 1987, now abandoned.

BACKGROUND OF THE INVENTION

1. Field of the Invention

The present invention relates to an opto-magnetic recording apparatus which irradiates an opto-magnetic recording medium with a light beam spot under application of a biasing magnetic field to record or erase information on the medium.

2. Related Background Art

A so-called opto-magnetic disk unit has been known as an opto-magnetic recording apparatus. In such an opto-magnetic disk unit, an opto-magnetic disk having a recording layer made of a thin ferromagnetic material layer formed on a non-magnetic material disk-shaped substrate is used as a recording medium. The recording layer is uniformly magnetized in a predetermined direction perpendicular to a film plane.

When information is to be recorded on the opto-magnetic disk, the disk is rotated and it is scanned by a light beam spot modulated with record information while a biasing magnetic field is added opposite to the above predetermined direction. Thus, the area of the recording layer onto which the light beam spot is irradiated is raised to the vicinity of the Curie temperature by light energy so that magnetization is essentially eliminated. As the disk rotates, the irradiation position of the light beam spot is moved to an other area, and the temperature of the first area is lowered. Thus, the first area is magnetized in the direction opposite to the surrounding area by the biasing magnetic field. Thus, the information is recorded as an inverted magnetic domain (record bit) on the recording layer in a record bit row (recorded track), and is formed on the disk concentrically or spirally. The light beam spot is irradiated onto the disk by an optical head comprising a laser light source and an object lens, or the like.

On the other hand, in the reproduction mode, a light beam, emitted from the semiconductor laser, of the light spot and polarized by a polarizer is irradiated to the record bit row formed on the magnetic film, and polarized as light which is reflected in accordance with the direction of magnetization of the irradiated area by a magnetic Kerr effect. The reflected light is split from the incident light by a beam splitter of the optical head, or the like, and directed to a photo-sensor through an analyzer. The direction of magnetization is detected based on the direction of polarization. In this manner, the information is reproduced.

When the information is to be erased, the recording medium is rotated and the light beam is irradiated to the record bit area while tracking the record bit row so that the temperature of the record bit area is raised to the vicinity of the Curie temperature, and then it is lowered while a DC biasing magnetic field, of the same direction as the direction of magnetization in the areas of the recording medium other than the record bit area, is applied. In this manner, the information is erased for recording of new information.

In the opto-magnetic disk unit, it is necessary to invert the biasing external magnetic field as described above, and an electromagnet is used as biasing magnetic field generation means.

In the magnetic disk unit, it is necessary to move the optical head to make the light beam spot emitted from the optical head access to a desired position. Since the movement of the optical head requires high speed, it is usually carried out by a mechanism which utilizes an electromagnetic force, such as a DC linear motor, or the like.

In the prior art opto-magnetic disk unit, the biasing magnetic field generation means is continuously activated in the recording or erasing mode. However, since the optical head is driven by the electromagnetic force, as described above, high speed and accurate access movement is not attained, because of disturbance by a leakage magnetic field from the biasing magnetic field generation means. Further, since the biasing magnetic field generation means and the optical head drive means are simultaneously activated, a large capacity power supply is required.

SUMMARY OF THE INVENTION

It is an object of the present invention to provide an opto-magnetic recording apparatus which resolves the problems encountered in the prior art apparatus and allows accurate access movement of an optical head with a small power supply capacity.

The above object of the present invention is achieved by deactivating biasing magnetic field generation means when optical head drive means is activated and activating the biasing magnetic field generation means after the access movement of the optical head has been completed.

DETAILED DESCRIPTION OF THE PREFERRED EMBODIMENTS

Figure 1:
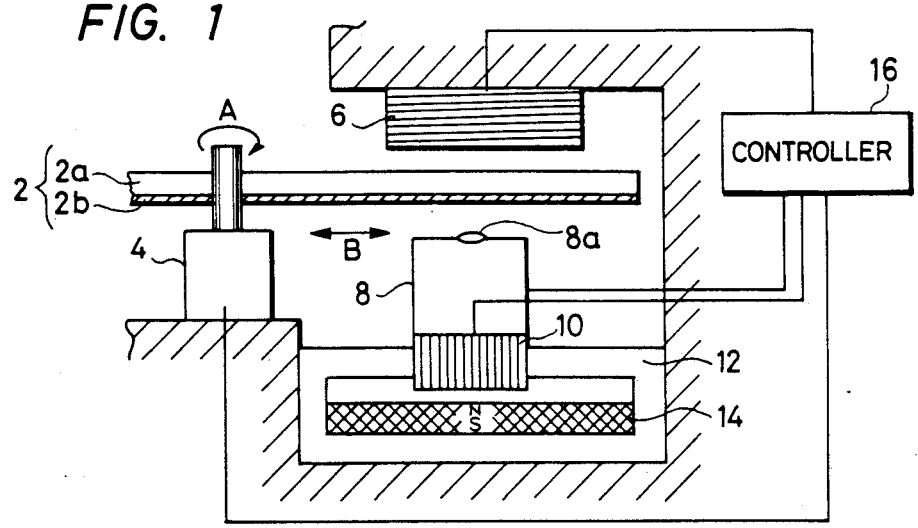
FIG. 1 shows a schematic view of one embodiment of an opto-magnetic recording apparatus of the present invention.

A preferred embodiment of the present invention will now be explained, referring to the drawings.

FIG. 1 shows the embodiment of an opto-magnetic recording apparatus of the present invention.

In FIG. 1, reference numeral 2 denotes an opto-magnetic disk having a recording layer 2b made of a ferromagnetic material film formed on a substrate 2a made of a non-magnetic material. Numeral 4 denotes a spindle motor. The disk 2 is rotated around a rotation shaft of the motor 4 in a direction indicated by arrow A. Numeral 6 denotes a biasing magnetic field generating electromagnet which applies a magnetic field perpendicularly to the disk plane. Numeral 8 denotes an optical head which includes a semiconductor laser light source, an object lens 8a and photo-detection means. The light beam emitted from the light source is focused by objective lens 8a to form a light beam spot on the recording layer 2b of the disk 2. The light reflected from the light beam spot is directed to the photo detection means through the objective lens 8a.

The optical head 8 is reciprocally driven radially with respect to the disk 2, that is, in a direction indicated by arrow B, by a DC linear motor which comprises a coil 10, a yoke 12 and a permanent magnet 14. The yoke 12 is of a ring-shape and a top thereof is aligned along the driving direction B and surrounded by the coil 10. The coil 10 is driven, with the optical head 8, along the top of the yoke in the direction 8. The permanent magnet 14 is arranged on the bottom of the yoke 12. The direction of magnetization of the permanent magnet 14 is vertical as shown in the drawing.

Those components and their functions are similar to those explained in connection with the prior art.

In FIG. 1, reference numeral 16 denotes a control unit comprising a central processing unit (CPU) which controls the rotation of the spindle motor 4, the current supplied to the coil of the biasing electromagnet 6, the optical head 8 and the current supplied to the coil 10 of the linear motor.

In the present embodiment, the information recording, reproducing and erasing operations are carried out under the control of the control unit 16 in the same manner as in the prior art, but the operation of driving the optical head 8 in the direction B to gain access to a desired position on the medium is different from that of the prior art.

Figure 2A:
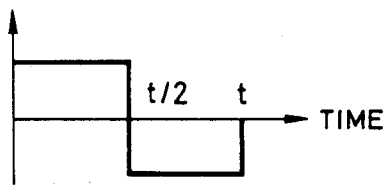
FIGS. 2A to 2C show timing charts for explaining recording and erasing processes in the present apparatus.
Figure 2B:
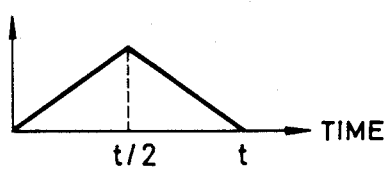
Figure 2C:
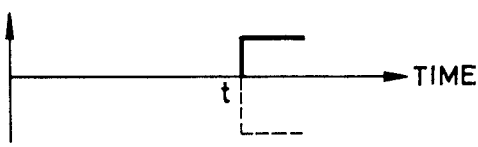

FIGS. 2A to 2C show timing charts of the information recording and erasing processes in the present embodiment.

In the case of access, the information track on which the light spot is presently positioned is detected by the optical head 8. (Assume that it is on the 1,000th track from the innermost track.) The control unit 16 calculates a difference between the information track on, or from, which the information is to be recorded or erased (for example, the 10,000th track) and the information track on which the light beam spot is presently positioned (the difference is 9,000 tracks in the present example). The control unit 16 supplies the current shown in FIG. 2A to the coil 10 of the linear motor. The coil 10 of the linear motor and the optical head 8 are driven toward the outer periphery of the disk in the right-hand direction of arrow B at a velocity as shown in FIG. 2B so that the light beam spot is positioned on the desired information track. When the optical head 8 is stopped at a time t, a current (shown by a solid line in FIG. 2C) to generate a magnetic field for recording information or a current (shown by a dashed line in FIG. 2C), to generate a magnetic field for erasing information is supplied to the biasing electromagnet 6 under the control of the control unit 16 as shown in FIG. 2C. Then, under the control of the control unit 16, the optical head 8 starts to emit the light beam and the information is recorded or erased.

Various modifications of the present embodiment may be made. For example, the present invention is not limited to an opto-magnetic disk apparatus, but it may also be applied to apparatus which use other opto-magnetic recording media, such as a card or tape, or the like.

What is claimed is:

1. An opto-magnetic recording apparatus, comprising:
    magnetic field generation means, comprising an electromagnet, for applying a biasing magnetic field to an opto-magnetic recording medium;
    an optical head for irradiating a light beam spot to a portion of the medium under the application of the biasing magnetic field to record or erase information;
    drive means for driving said optical head by an electromagnetic force for accessing a desired position on the medium with the light beam spot; and
    control means for controlling current supply to said electromagnet and for controlling current supply to said drive means for position accessing said control means prohibiting current supply to said electromagnet during an entire time period of accessing by said current supply to said drive means 2. An opto-magnetic recording apparatus according to claim 1, wherein said drive means comprises a DC linear motor.

3. An opto-magnetic recording apparatus according to claim 1, wherein said optical head comprises a light source, an objective lens and photo-detection means.

4. An opto-magnetic recording apparatus according to claim 1, wherein said opto-magnetic recording medium comprises an opto-magnetic disk.

* * * * *

UNITED STATES PATENT AND TRADEMARK OFFICE
CERTIFICATE OF CORRECTION

PATENT NO. : 4,972,395

DATED : November 20, 1990

INVENTOR(S) : Hisatoshi Baba

It is certified that error appears in the above-identified patent and that said Letters Patent is hereby corrected as shown below:

COLUMN 1

Line 7, "continuation-in-part" should be deleted;
    Line 8, "division," should be deleted;
    Line 34, "energy" should read --energy,--;
    Line 36, "an other" should read --another--;
    Line 50, "polar-" should read --reflected--; and
    Line 51, "ized" should be deleted and "reflected" should read --polarized--.

COLUMN 2

Line 65, "photo detection" should read --photo-detection--.

COLUMN 3

Line 6, "direction 8." should read --direction B.--.

COLUMN 4

Line 30, "accessing said" should read --accessing, said--; and

UNITED STATES PATENT AND TRADEMARK OFFICE
CERTIFICATE OF CORRECTION

PATENT NO. : 4,972,395

DATED : November 20, 1990

INVENTOR(S) : Hisatoshi Baba

It is certified that error appears in the above-identified patent and that said Letters Patent is hereby corrected as shown below:

COLUMN 4

Line 33, "means" should read --means--.

Signed and Sealed this

Sixteenth Day of June, 1992

Attest:

DOUGLAS B. COMER

Attesting Officer

Acting Commissioner of Patents and Trademarks